Dec. 29, 1931.   M. O. SCHUR   1,838,710
CONSISTENCY REGULATOR
Filed Oct. 1, 1928   12 Sheets-Sheet 2

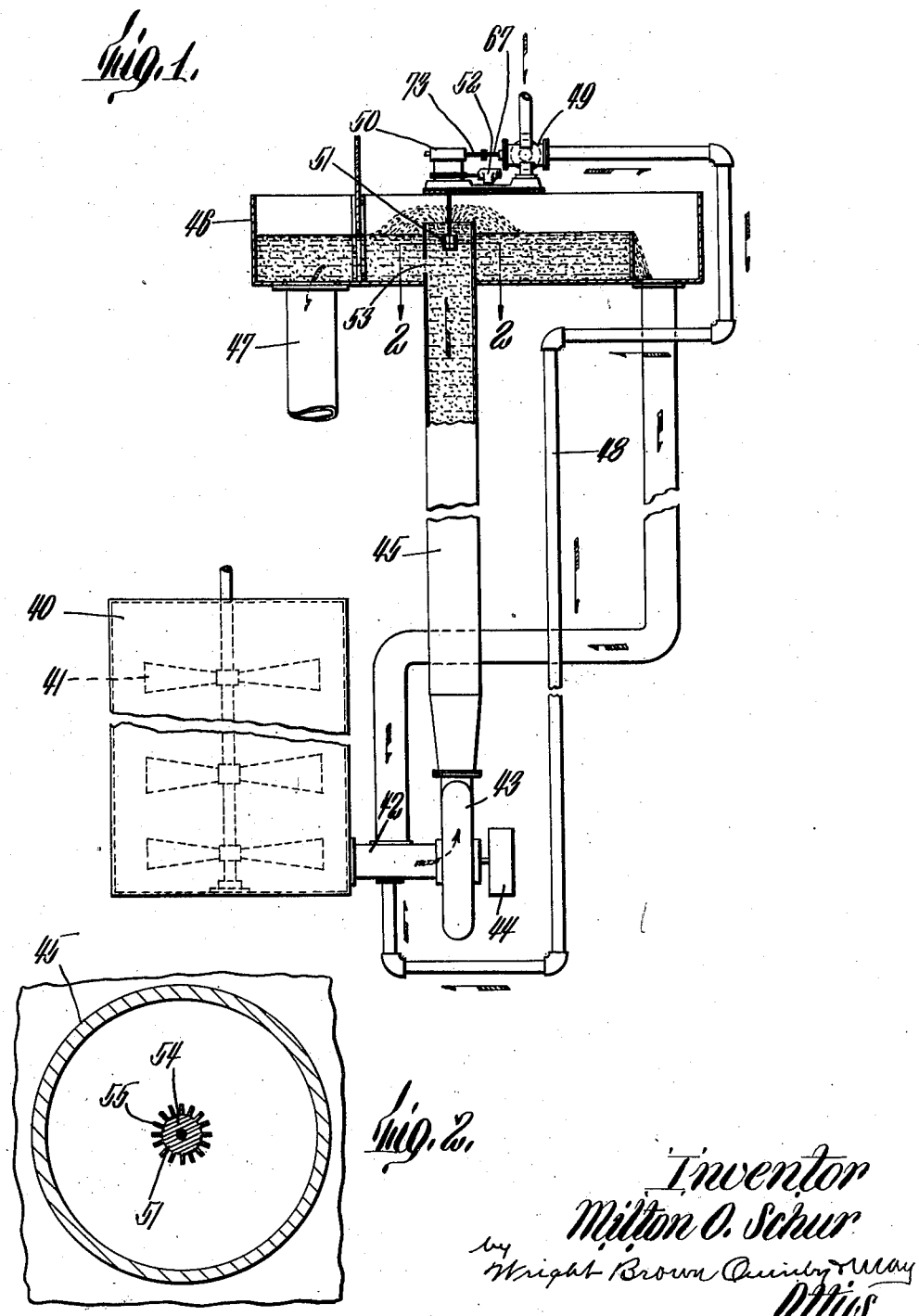

Inventor
Milton O. Schur
by Wright, Brown, Quinby & May
Attys

Dec. 29, 1931.   M. O. SCHUR   1,838,710
CONSISTENCY REGULATOR
Filed Oct. 1, 1928   12 Sheets-Sheet 3

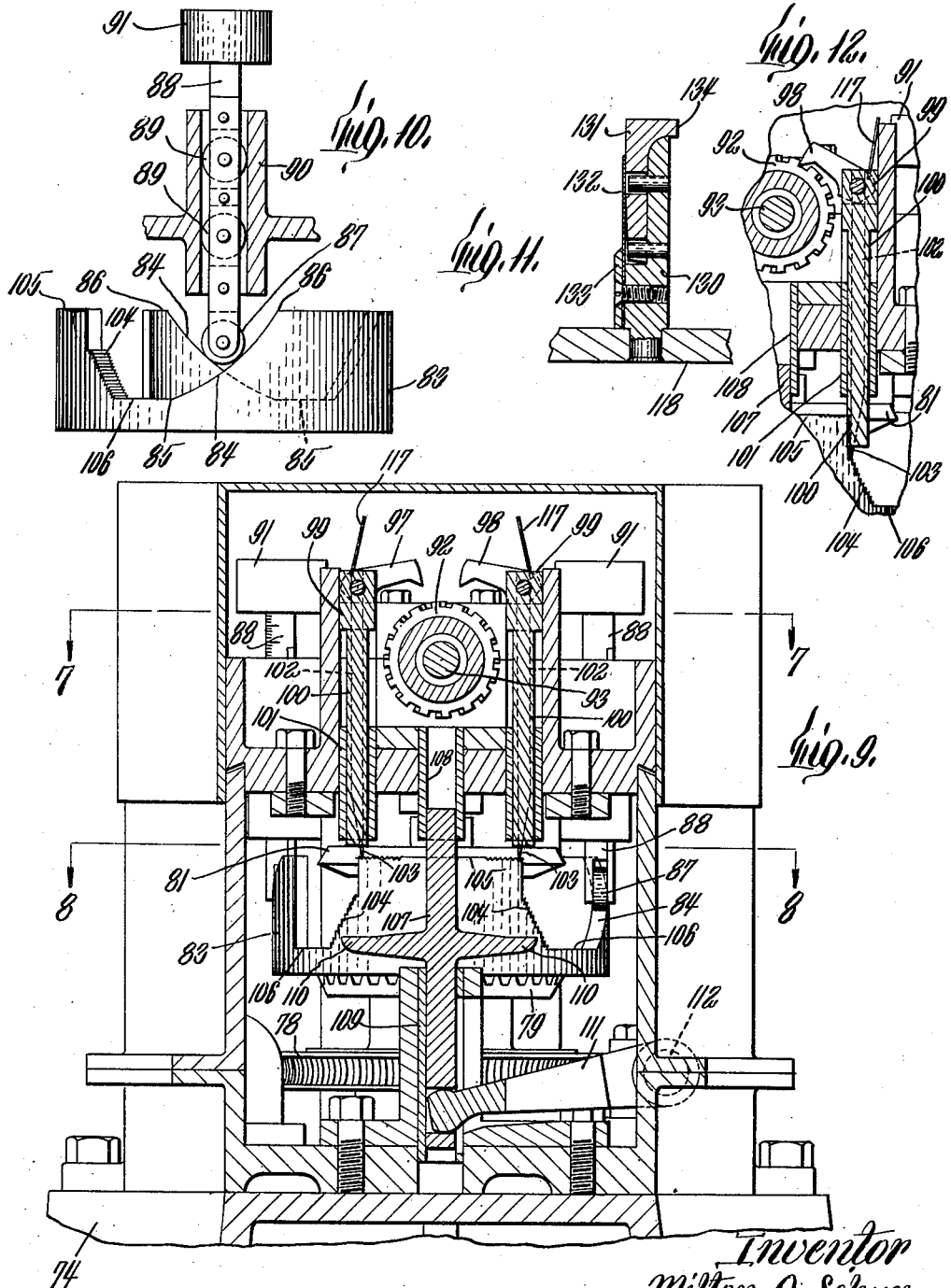

Dec. 29, 1931. M. O. SCHUR 1,838,710
CONSISTENCY REGULATOR
Filed Oct. 1, 1928  12 Sheets-Sheet 7

Inventor
Milton O. Schur
by Wright Brown Quinby May
Attys

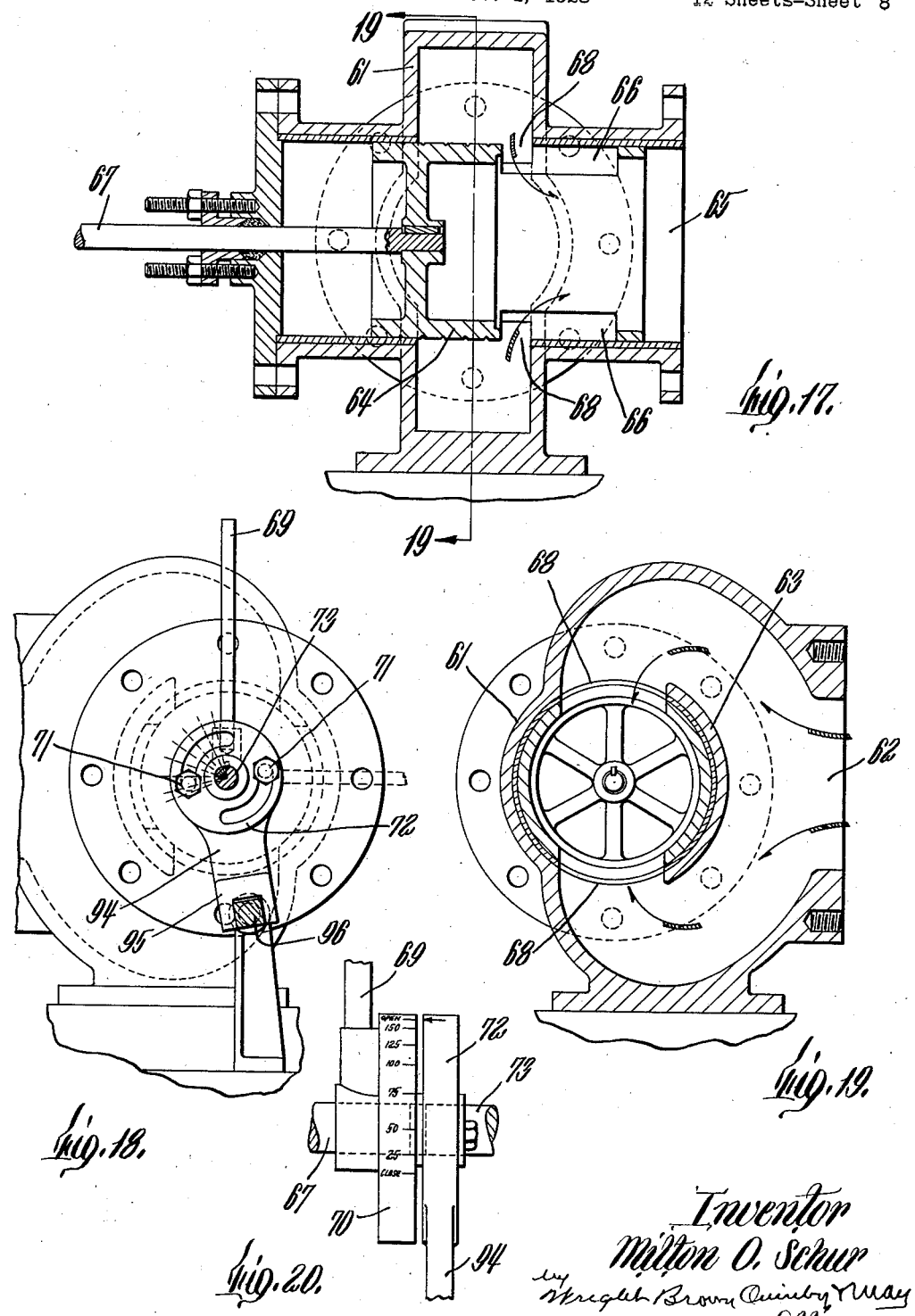

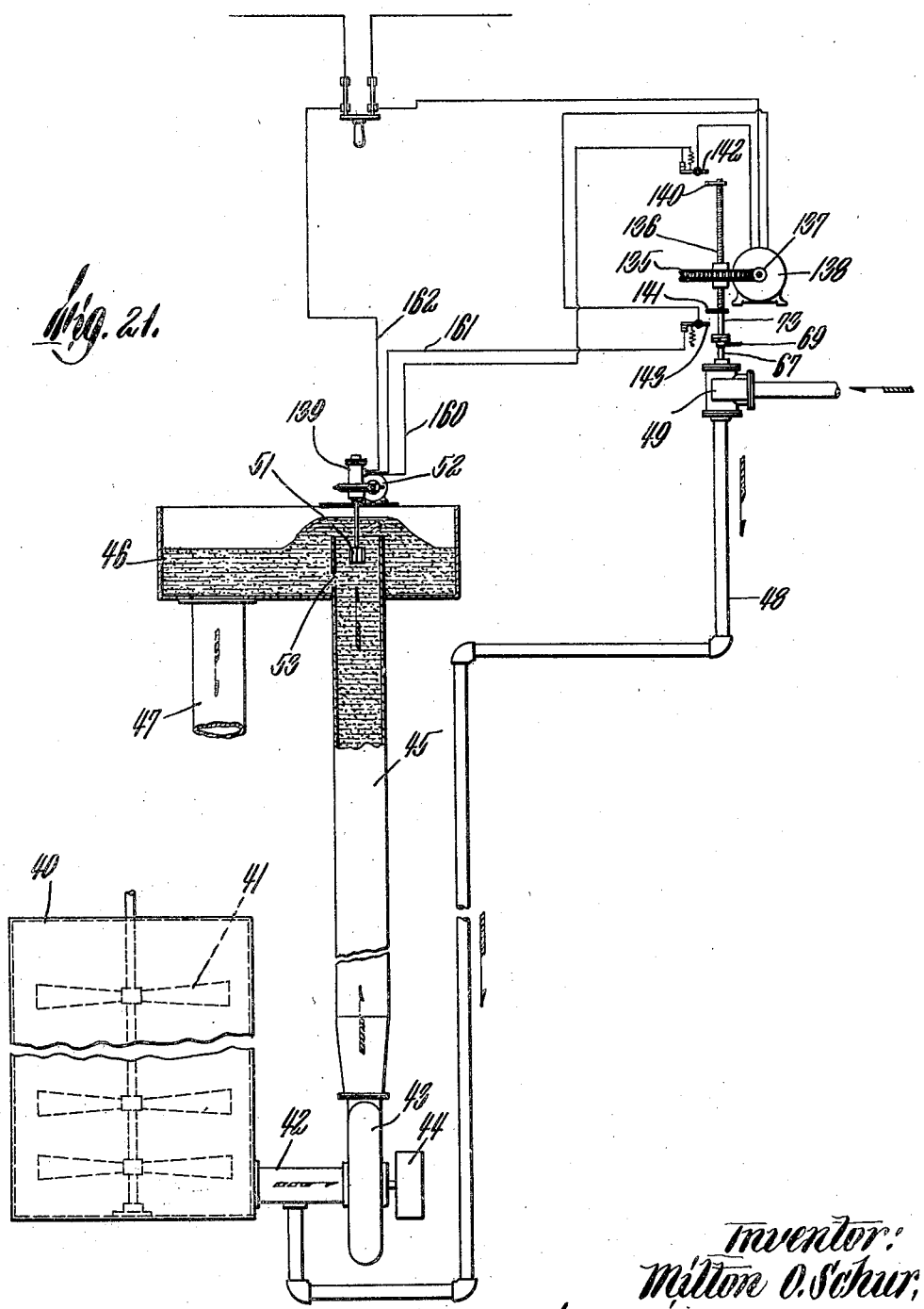

Dec. 29, 1931.  M. O. SCHUR  1,838,710
CONSISTENCY REGULATOR
Filed Oct. 1, 1928   12 Sheets-Sheet 10
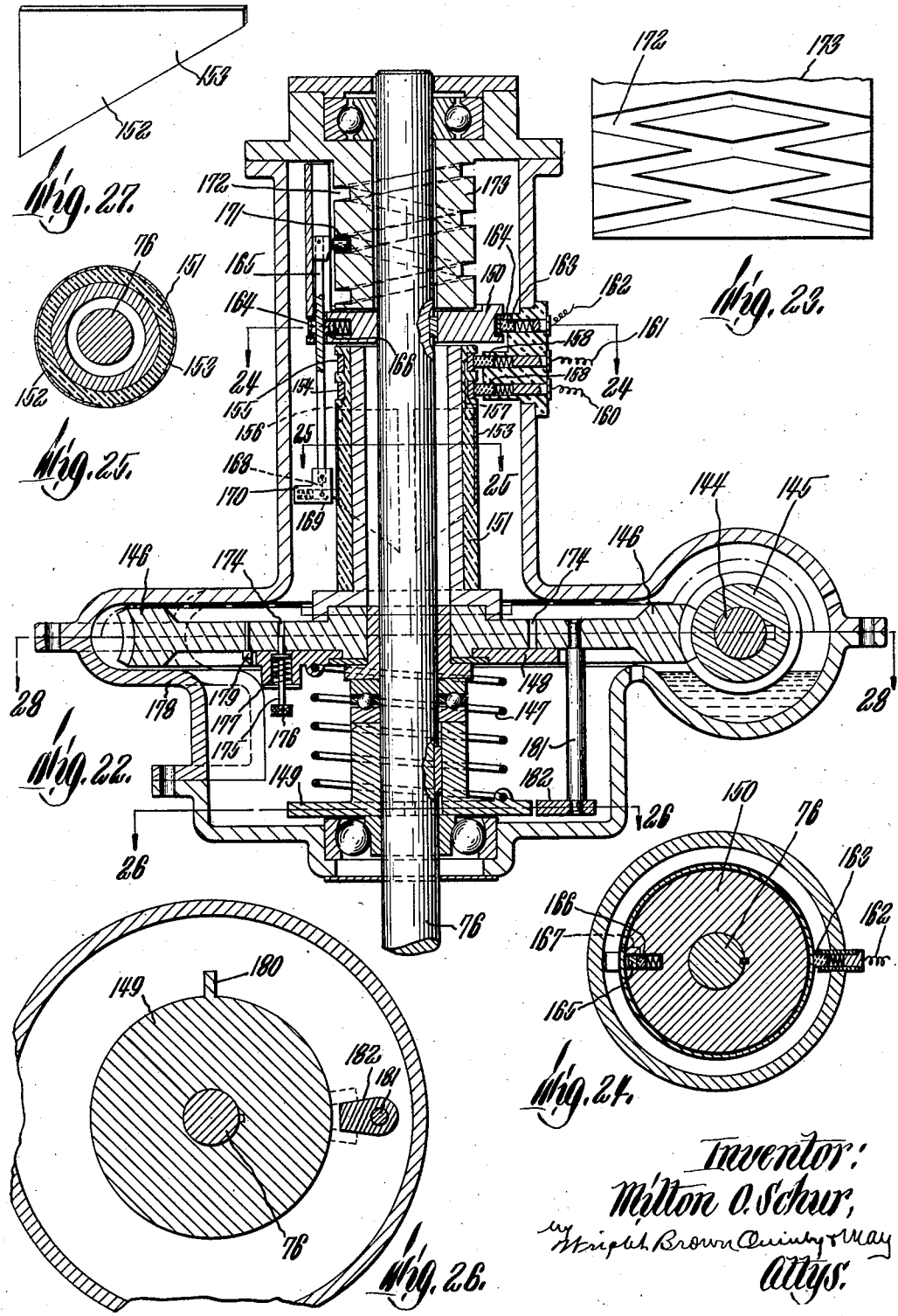

Dec. 29, 1931.   M. O. SCHUR   1,838,710
CONSISTENCY REGULATOR
Filed Oct. 1, 1928   12 Sheets-Sheet 11

Inventor:
Milton O. Schur,
by Wright Brown Quinby May
Attys.

Dec. 29, 1931.   M. O. SCHUR   1,838,710
CONSISTENCY REGULATOR
Filed Oct. 1, 1928   12 Sheets-Sheet 12
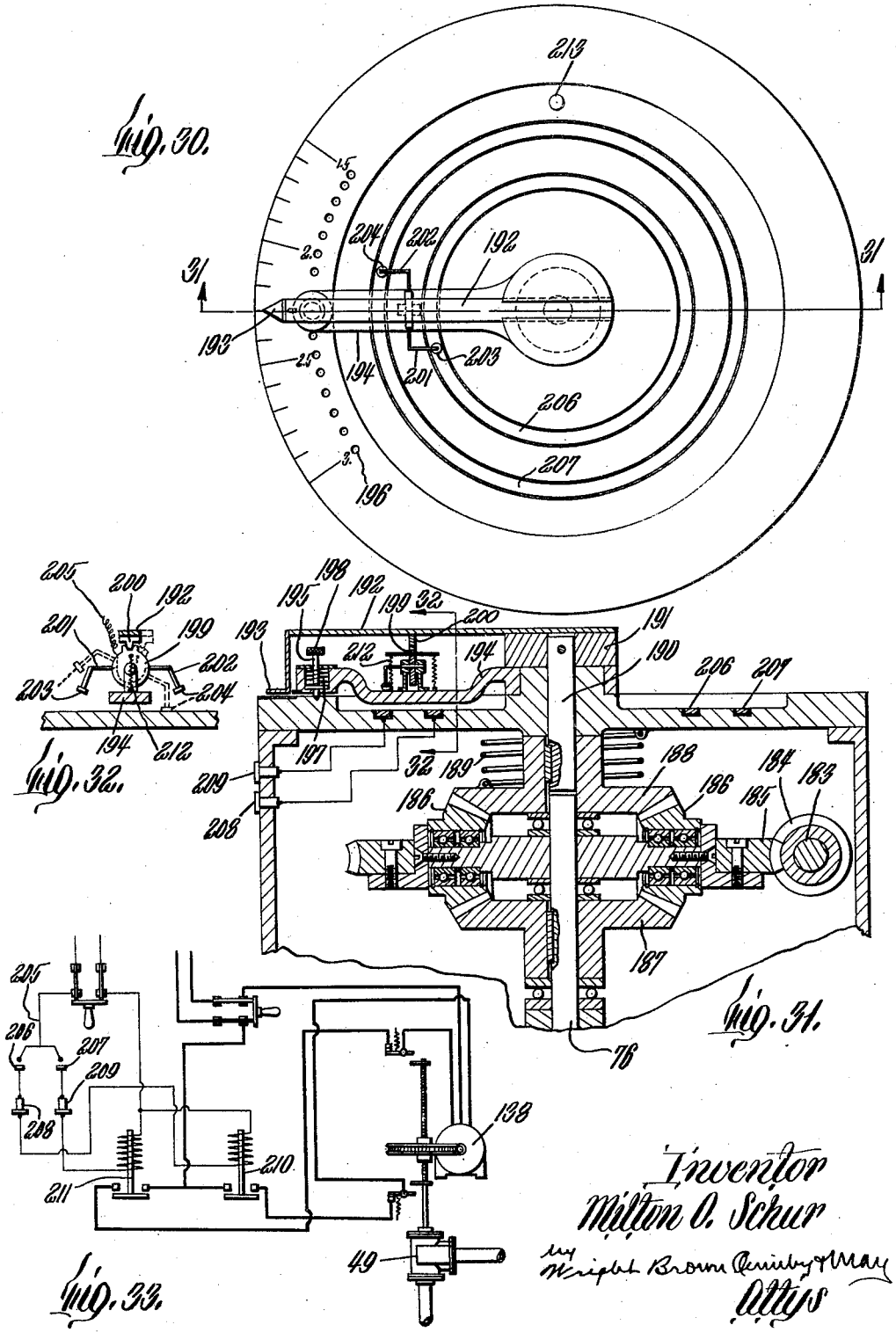

Patented Dec. 29, 1931

1,838,710

UNITED STATES PATENT OFFICE

MILTON O. SCHUR, OF BERLIN, NEW HAMPSHIRE, ASSIGNOR TO BROWN COMPANY, OF BERLIN, NEW HAMPSHIRE, A CORPORATION OF MAINE

CONSISTENCY REGULATOR

Application filed October 1, 1928. Serial No. 309,630.

This invention relates to a method of and apparatus for measuring the viscosity of a liquid, more particularly a liquid which is in motion, and the automatic maintenance of a substantially constant viscosity by mechanism which is sensitive to small changes in the viscosity of the liquid and is capable of altering the viscosity in response to such changes. To this end a member may be, according to the invention, constantly moved in the liquid and the resistance to such motion measured, the liquid itself being at rest or in motion. According to the embodiments of the invention hereinafter described in detail the member which is moved in the liquid may conveniently be rotated therein. While the invention is applicable to liquids in general and to the automatic regulation of any means capable of altering the viscosity of the liquid, the embodiments of the invention illustrated in the drawings and hereinafter described are more especially designed for aqueous suspensions of cellulosic pulp such as is used for making paper and many other products. As is well known in the pulp and paper making industry, pulp suspensions have peculiar physical characteristics which cause them to behave differently from ordinary liquids, particularly in the case of the thicker suspensions, so that most devices for measuring characteristics of liquids are practically useless when applied to the measurement of pulp stock characteristics owing to various causes such as the peculiarities of flow of pulp stock, the tendency of pulp stock to clog openings and passages, and the tendency of fibers from a stream splashing into a receptacle to stick to the sides of the receptacle and to cake thereon.

According to the present invention, mechanism is provided which is reliably operative not only with liquids in general but with pulp stock of any consistency within the range of mill practice.

A more specific purpose of the invention is to measure and regulate the consistency of pulp stock as it passes through a mill for treatment. By the use of apparatus which is responsive to changes in the internal friction or viscosity of the stock, the consistency of the stock (i. e., the percentage of dry weight of pulp in the suspension) may be measured and regulated since, in ordinary mill practice, the variations of other factors affecting viscosity (such as the "slowness" of the stock, and its temperature) are negligible at any one point in the mill, but the consistency of the stock is subject to considerable fluctuation. Hence for practical purposes a measurement of the viscosity of pulp stock is a measure of its consistency.

In general consistency regulators heretofore devised are subject to irregularities of performance, especially with unbeaten or partly beaten stock, the coarse fibers of which tend to plug apertures and to collect on balanced parts, upsetting the control and rendering the performance of the regulator unreliable. Accurate and reliable regulation of consistency is essential for uniformity of product since other ingredients which are added from time to time in treating the pulp must in many cases be carefully proportioned to the quantity of pulp itself. For some products a high degree of accuracy is necessary, and relatively slight deviations from the correct proportion of added chemicals to the quantity of pulp will render the product inferior or useless. In keeping track of the rate of delivery of pulp at any point through the pulp-handling apparatus in the mill it is practically necessary that the consistency be known so that the pulp delivery rate may be determined from the rate of delivery of the pulp suspension. By reliably maintaining a constant known consistency of pulp stock at a given point in its course prior to its point of delivery, the rate of pulp delivery can be accurately controlled by controlling the delivery rate of the pulp stock.

In a mill for preparing pulp or making pulp products, the aqueous suspension of pulp progresses through the mill in one or more streams the size of which depends on the capacity of the apparatus through which the pulp passes for treatment. It is an object of this invention to provide apparatus constantly responsive to viscosity conditions in such streams rather than in samples taken therefrom either continuously or intermittently, though if preferred the apparatus may be used in a sample stream instead of in the main stream. It is also an object of the invention to provide apparatus for automatically regulating the consistency of any kind of pulp suspension, said apparatus being self-cleaning and independent of the rate of flow of stock therethrough.

In accomplishing the desired results as set forth, the stream of stock may be passed through a penstock which is preferably vertical. In this penstock a suitable paddle is rotated at constant speed, the axis of rotation in the embodiment illustrated being in line with the direction of flow of the stock. The paddle may be constructed in a variety of ways and the invention is not limited to nor dependent on any particular size, shape, number or arrangement of the blades. A few of the many possible ways of constructing the paddles are illustrated in the drawings. In each case the paddle when rotated encounters frictional resistance which varies according to the viscosity of the stock so that in order to maintain a constant rotation, a torque must be impressed on the paddle shaft commensurate with the resistance offered by the stock. According to the invention, mechanism is associated with the paddle which is responsive to changes in the torque required to maintain the constant rotation of the paddle, the mechanism being constructed to act automatically to increase or decrease the diluting water supplied to the stream as needed to maintain the stream at the desired consistency.

For a more complete understanding of the invention, reference is had to the description which follows and to the drawings of which:

Figure 1 is a diagrammatic representation of apparatus including an embodiment of the invention.

Figure 2 is a section on the line 2—2 of Figure 1.

Figure 9 is a section on the line 9—9 of Figure 7.

Figure 10 is an elevation of the cam member showing a cam follower in operative position.

Figure 11 is a section on the line 11—11 of Figure 7.

Figure 12 is a fragmentary section showing a portion of Figure 9 with the parts in a different position of operation.

Figure 17 is a sectional view of an improved control valve, the section being taken on the line 17—17 of Figure 3.

Figure 18 is an end view of the valve, the section of the valve stem being taken on the line 18—18 of Figure 3.

Figure 19 is a section of the valve on the line 19—19 of Figures 4 and 17.

Figure 20 is an elevation of an adjustable coupling between the valve stem and a control rod.

Figure 21 is a diagrammatic illustration of electrically operated mechanism adapted to perform the same functions as that illustrated in Figure 1.

Figure 22 is a vertical section of the control mechanism illustrated in Figure 21.

Figure 23 is a development on a plane of the traversing thread shown in Figure 22.

Figure 24 is a section on the line 24—24 of Figure 22.

Figure 25 is a section on the line 25—25 of Figure 22.

Figure 26 is a section on the line 26—26 of Figure 22.

Figure 27 is an elevation of one of the electrical contact plates shown in Figure 22, this view showing the plate in its flat shape before being bent around for fitted engagement on the surface of a cylindrical member.

Figure 30 is a plan view of a modified form of mechanism for electrical operation.

Figure 31 is a fragmentary section on the line 31—31 of Figure 30.

Figure 32 is a section on the line 32—32 of Figure 31.

Figure 33 is a wiring diagram showing the mechanism connected for operation.

Figure 3:
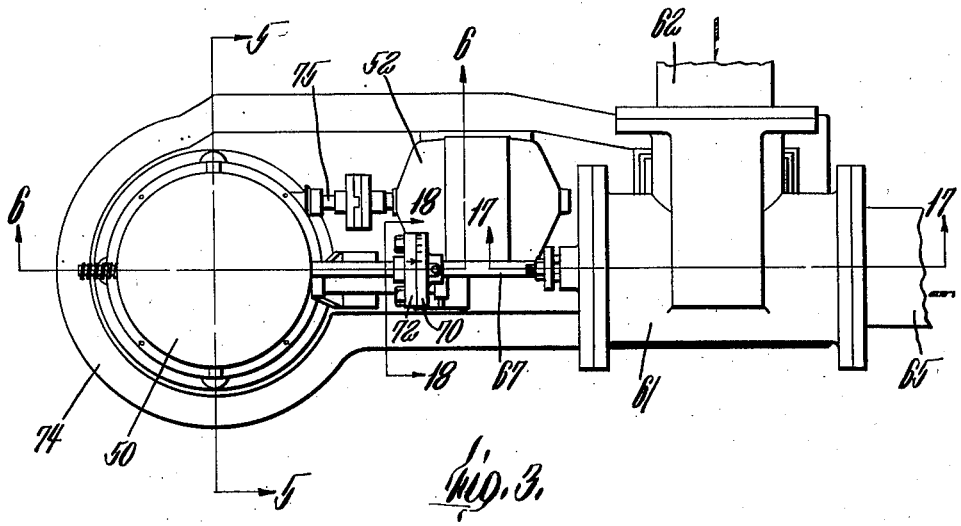
Figure 3 is a plan view of mechanism embodying the invention.

While the invention applies generally to the measurement of consistency or viscosity of liquids in general, the embodiments illustrated in the drawings and hereinafter described in detail are more especially intended for use in measuring and controlling the viscosity of liquids which, by reason of peculiar characteristics, are difficult to measure. More especially, these embodiments are designed for use in regulating the consistency of aqueous suspensions of cellulosic pulp, the viscosity of such suspensions being almost entirely dependent on the consistency when the slowness of the stock is substantially unvarying.

Figure 1 illustrates diagrammatically apparatus which may be installed in a pulp mill and which includes an embodiment of the invention. This apparatus as shown comprises a stock tank 40 having therein suitable stirring paddles 41 to prevent settling of the pulp fibers. From this tank a pipe 42 leads to a suitable pump 43 which is preferably power driven as by a belt pulley 44. A pump of the centrifugal type is illustrated, this pump discharging the pulp upwardly into a vertical penstock 45 the upper end of which extends through the bottom of a suitable box 46. This penstock is open at the top so that pulp ascending therein flows over the upper edge into the box 46 and passes through a discharge pipe 47 to any desired part of the mill for further treatment. The stock in the tank 40 is preferably maintained at a consistency somewhat thicker than is desired for the stock which passes out through the discharge pipe 47. In order to thin the stock from the tank 40 to a suitable consistency water may be supplied through a suitable pipe 48 which passes through a control valve 49 and enters the pipe 42 so that it is thoroughly mixed with the stock as it passes through the centrifugal pump 43.

In order to control the action of the valve 49 so as to supply the correct amount of water to the pipe 42 to obtain the desired consistency in the box 46, I provide a control mechanism, indicated at 50, which is responsive to the resistance to rotation set up by a suitable paddle 51 which is mounted to rotate in the ascending column of pulp stock in the penstock 45. The paddle 51 is preferably driven at a substantially constant speed, as by a suitable motor 52. The resistance to rotation, which is equivalent to the torque impressed on the paddle shaft, is constantly and automatically measured by the mechanism 50 which controls the valve 49. This mechanism, as will be hereinafter described in detail, is so constructed that if the consistency of the stock is thinner than desired, the decreased torque required to rotate the paddle will automatically result in a partial shutting off of the valve 49 so that the water supply to the pipe 42 is diminished until the stock flowing through the penstock 45 reaches the desired consistency. If the stock becomes too thick, the increased torque impressed on the paddle 51 results in opening of the valve 49 so as to increase the water supply to the pipe 42, thus thinning the stock to the desired consistency. If, for any reason, the supply of pulp should fail as, for example, by reason of the stopping of the pump 43, the pulp in the upper portion of the penstock 45 will escape through an opening 53 into the box 46, thus leaving the paddle 51 exposed. This will cause the mechanism 50 to operate the valve 49 as for a pulp stock which is overdilute, that is, the valve 49 will be shut down so that the flooding of the apparatus with diluting water is thus automatically prevented.

Figure 13:
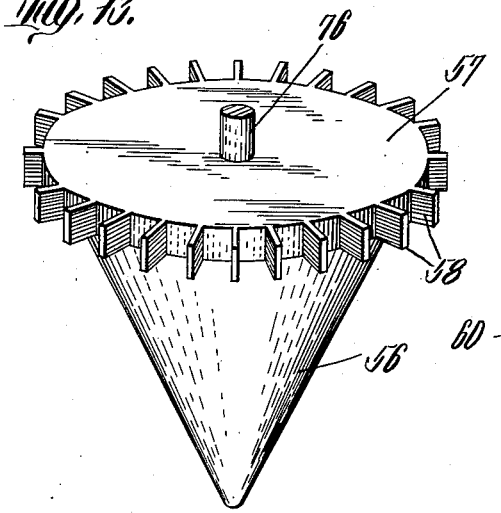
Figure 13 is a perspective view of a paddle suitable for use with the mechanism illustrated in Figure 1.
Figure 15:
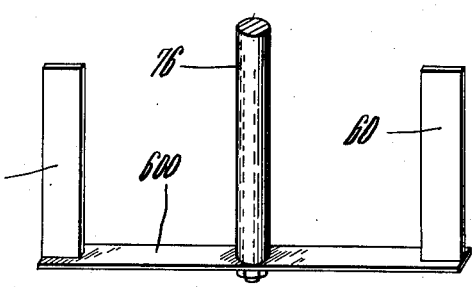
Figures 14, 15 and 16 are perspective views of other forms of paddle.
Figure 14:
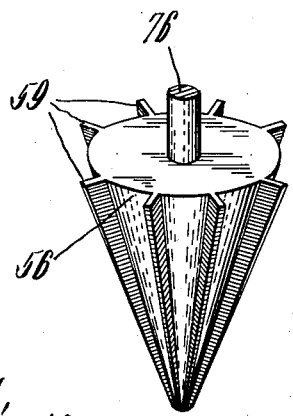
Figure 16:
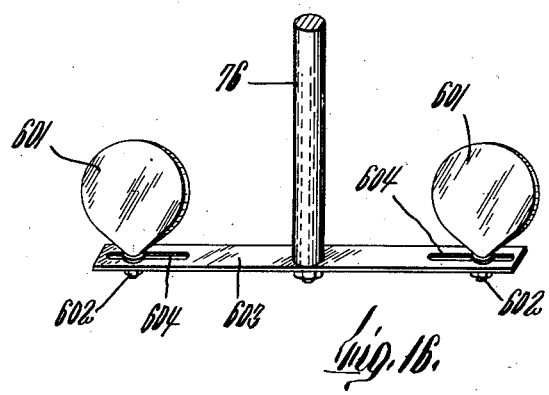
Figure 28:
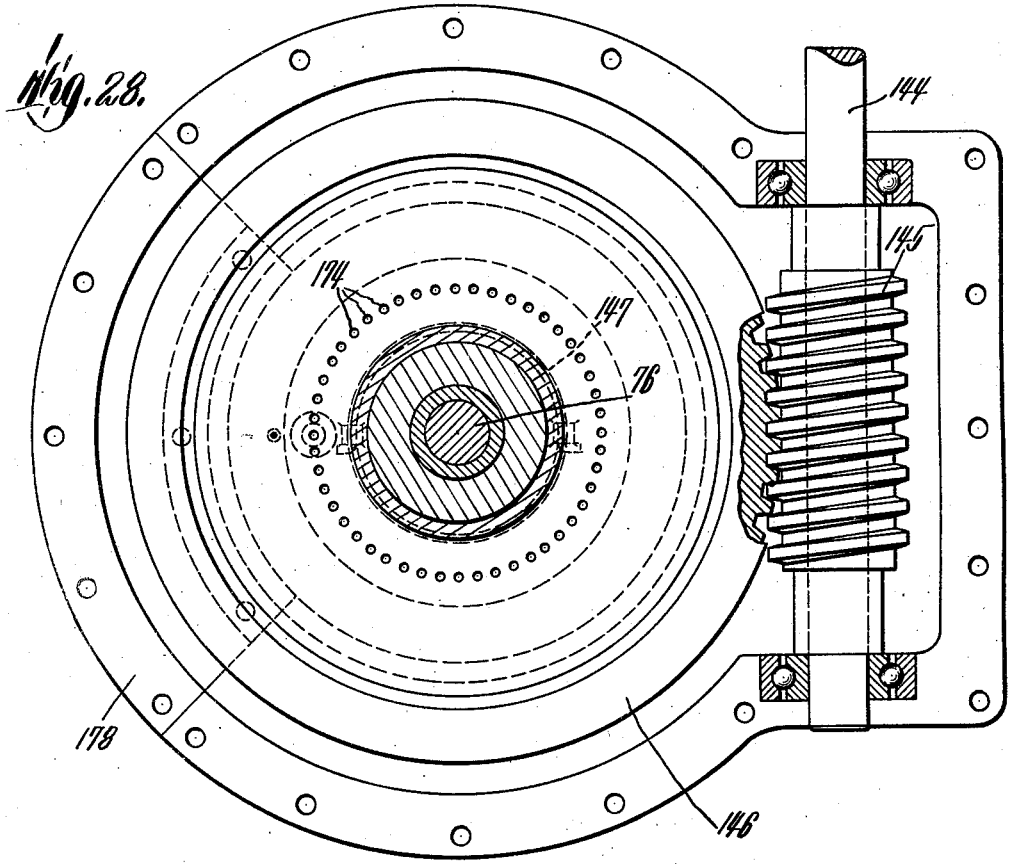
Figure 28 is a section on the line 28—28 of Figure 22.

The paddle 51 is designed in such a way as to entrain a cylindrical or conical shell of the moving pulp and to rotate this shell against frictional resistance of the surrounding aqueous pulp. In order to minimize the quantity of pulp actually rotating within the paddle itself, the paddle is preferably designed with a body 54 of considerable diameter on which are vertical blades 55 extending radially from the body 54 for a comparatively short distance. In this way the effect of the paddle is to cause a thin shell of pulp to move against non-rotating pulp so that the resistance to rotation offered by the paddle 51, that is, the torque which must be impressed on the paddle to sustain its substantially constant rotation is substantially a measure of the internal friction or viscosity of the pulp suspension and hence of the consistency of the pulp suspension and is practically unaffected by variations in rate of flow of stock through the penstock. As shown in Figure 1 the paddle may be cylindrical in shape. In Figures 13 to 16 inclusive other forms of paddles suitable for the apparatus are illustrated. Figure 13 illustrates a paddle with a conical body 56 having a narrow cylindrical upper portion 57. On the periphery of the cylindrical portion is mounted a series of short radially extending blades 58. The purpose of the conical body 56 is to avoid the possibility of disturbing eddy currents which might be formed by the flat end of a cylindrical paddle opposed to the direction of flow of the pulp. The form of paddle shown in Figure 14 is somewhat similar to that shown in Figure 13 in that it is of generally conical form. It is provided, however, with narrow blades 59 which project radially and extend substantially the entire length of the body portion 56. The paddle illustrated in Figure 15 comprises a pair of flat narrow blades 60 arranged parallel to and spaced from the shaft 76. These blades may be attached to the shaft 76 for rotation therewith by any suitable means such as a cross-head 600. Instead of the narrow blades 60, as shown, I may employ other shapes such as the circular members 601 shown in Figure 16. These blades may be permanently connected to the shaft 76 or may be adjustably secured as by nuts 602 to a cross-head 603, the cross-head being slotted as at 604 to permit adjustment of spacing between the blades 601 and the shaft 76, as well as rotational adjustment of the blades 601 to vary the angle at which the faces of the blades are presented to the stock. As shown the faces of the blades 601 are in planes which are radial with respect to the axis of rotation of the shaft 76, but the blades are capable of adjustment so as to be in other planes. It is obvious that a great variety of paddles may be constructed in addition to those illustrated.

In order to provide an automatic water supply of adjustable magnitude, I may provide a special type of valve as illustrated in Figures 17 to 19. This valve comprises an exterior casing 61 into which the water supply may enter through a port 62, the flow being divided by an interior casing 63 so that it passes through two lateral ports in the valve member 64 and leaves the casing through a discharge port 65. The valve member 64 as shown is in the shape of a hollow cylinder and is reciprocable in a cylindrical chamber in the casing formed by a portion of the external casing 61 and the inner portion 63. The valve member 64 fits snugly in this cylindrical chamber and is rotatable therein as well as reciprocable. The pair of ports 66 formed in the sides of the valve member 64 are opposed to each other so as to register with a pair of openings 68 between the casing 61 and the inner casing 63, as shown in Figure 19. When the valve stem 67 (illustrated in Figure 17) is pushed as far as possible toward the right the ports 66 will move entirely out of register with the ports 68 thus closing the valve. The valve may also be closed by rotating the member 64 until the ports 66, 68 are entirely out of register. In order to adjust the capacity of the valve for reciprocating operation, the stem 67 may be adjustably rotated so that the ports 66 and 68 register fully as to their mutual angular positions, as shown in Figure 19. It is obvious that a partial rotation of the valve member 64 will narrow the openings by which the water may pass from the inlet port 62 to the outlet port 65 so that when the valve is fully opened by drawing the stem 67 as far to the left as possible the maximum delivery of water may be adjusted as desired, the reciprocations of the stem 67 on the valve member 64 shutting off the valve proportionately, whatever the adjustment. In order to effect such valve adjustment in the apparatus illustrated, I may provide a convenient handle 69 mounted on the stem 67, together with a disk 70 on which may be inscribed suitable scale markings as shown in Figure 20. This disk may be adjustably clamped, as by a pair of bolts and nuts 71 to a suitable disk 72 mounted on a control rod 73 which is reciprocable by the automatic apparatus 50 in response to the torque impressed on the paddle 51, as will be hereinafter described. If it is desired to operate the valve by rotation, the capacity of the valve may be adjusted by axial movement of the valve member 64. A variable valve of this type permits adaptation of the apparatus as a whole to different conditions of operation in a mill so that the most advantageous travel of the valve stem may be employed. Thus if the flow of stock through the penstock be relatively large, a correspondingly large flow of diluting water must be available to counteract excessive stock thickness. On the other hand, a water supply excessively large in comparison with the rate of stock flow would respond too freely to small movements of the controlling members and would thus tend to cause irregularity of dilution and "hunting" in the control mechanism. By reducing the capacity of the valve in accordance with a reduced pulp flow, the full motion of the valve stem may be utilized and the rate of addition of water will be commensurate with the variation of the consistency of the stock from normal.

Figure 4:
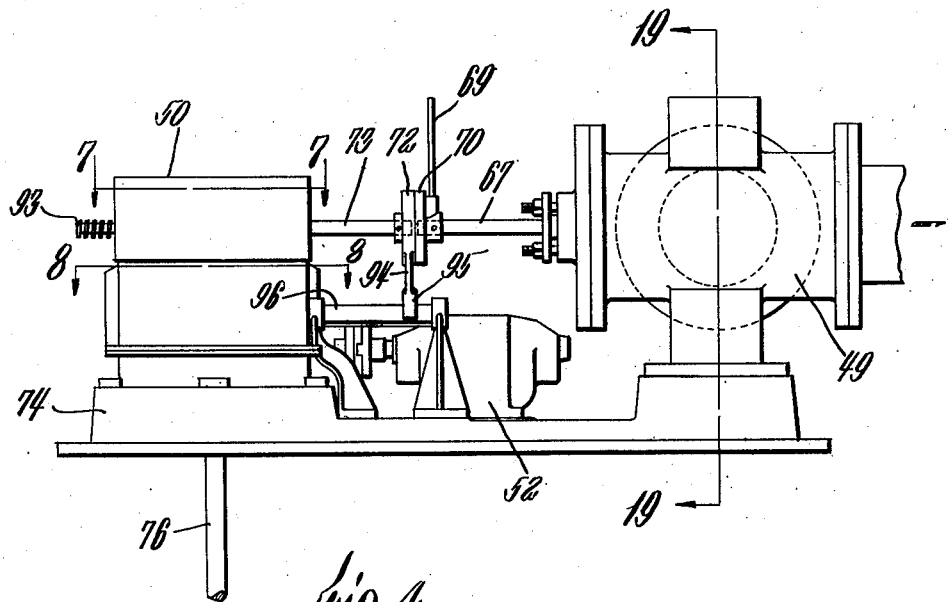
Figure 4 is a side elevation of the same.
Figure 5:
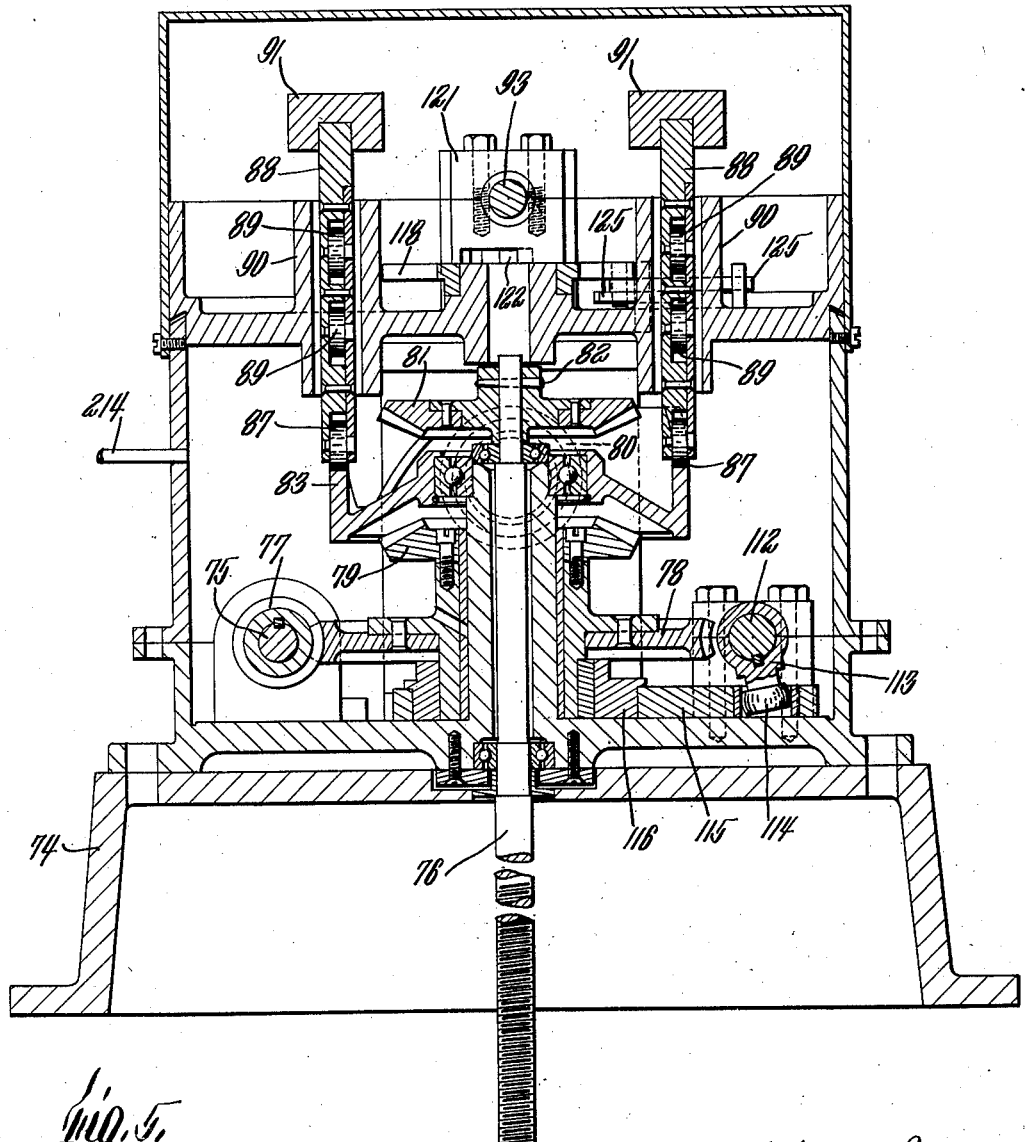
Figure 5 is a section on the line 5—5 of Figure 3.
Figure 6:
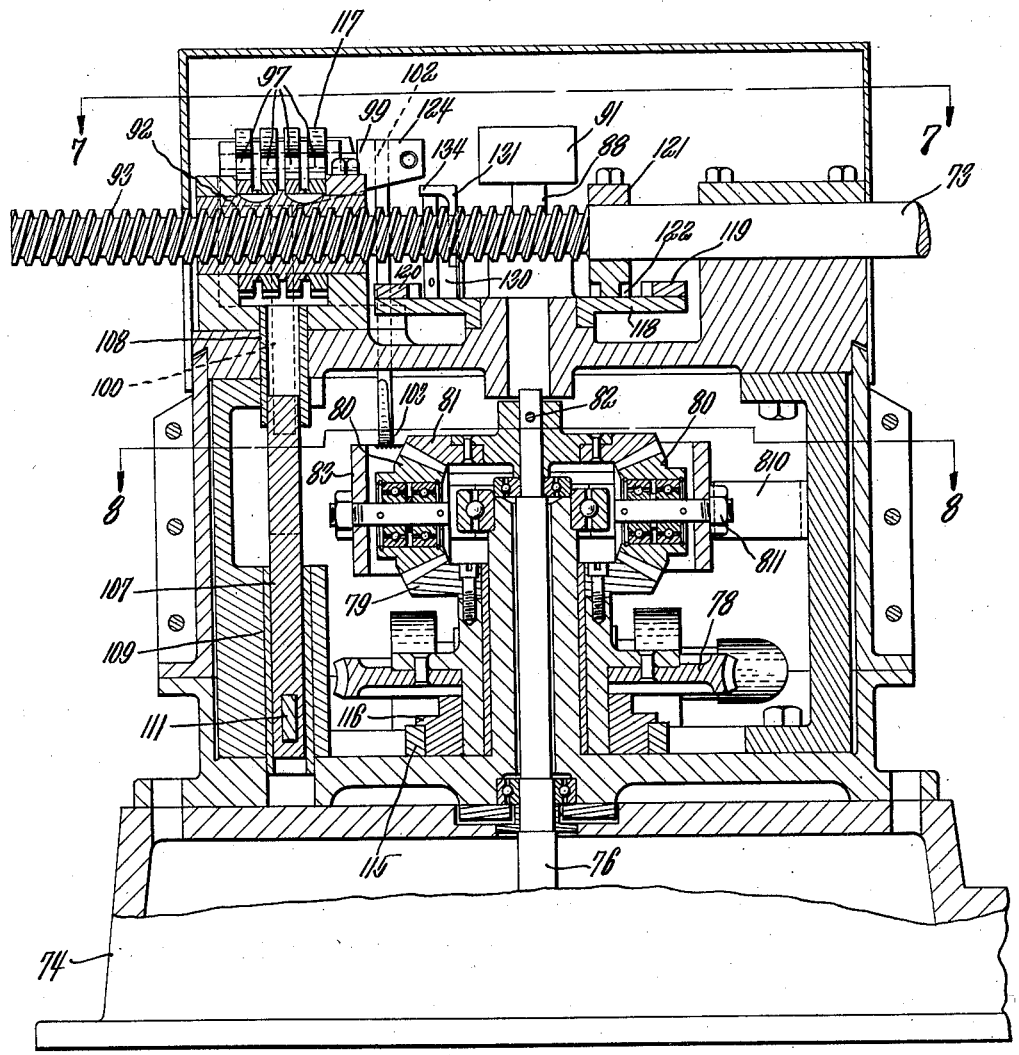
Figure 6 is a section on the line 6—6 of Figure 3.

The external aspect of the mechanism by which the valve 49 is controlled in response to torque impressed on the paddle 51 is illustrated in Figures 3 and 4. As therein shown, this portion of the apparatus may be mounted on a suitable base 74 which may also carry the motor 52 and the valve 49. The control mechanism may be housed in a suitable casing of one or more parts through which extend the control rod 73, a drive shaft 75 connecting the mechanism with the motor 52, and a paddle shaft 76 extending vertically downward to support the handle 51 within the end portion of the penstock 45. The motor 52 is connected to the paddle shaft 76 through a train of gearing illustrated in Figure 5 and comprising a worm 77 meshing with a worm gear 78 which carries a bevel gear 79 connected through a pair of pinions to a bevel gear 81 which is fixed to the paddle shaft 76 as by a pin 82. The pinions 80 as illustrated in Figure 6 are mounted on a cylindrical floating member 83. In order to transmit the torque from the motor 52 through the pinions 80 to the paddle shaft 76, it is obvious that the floating member 83 must be held against rotation. By opposing resilient means to the rotation of the floating member 83 the latter will be capable of turning through an angle depending on the resistance of the paddle and the strength of the opposing means, and the greater the torque impressed on the shaft 76 the greater will be the angle of rotation of the floating member 83 to balance the opposition of the resilient holding means. Thus the angular position of the member 83 may be a measure of the torque impressed on the shaft 76, that is, of the resistance of the paddle 51 to rotation. As shown in Figures 5 and 6 suitable ball bearings are preferably supplied for all the gears so as to minimize friction which would disturb the direct relation existing between the angular position of the member 83 and the torque impressed on the paddle shaft 76.

The resilient resistance to rotation of the floating member 83 may be supplied in a number of ways. As shown on the drawings I may provide this resistance by forming suitable can surfaces 84 on the upper edge of the member 83 as shown in Figures 9 and 10. These cam surfaces, as shown, are two in number and comprise curves rising from low points 85 on the upper edge of the member 83 to high points 86. A pair of suitable cam followers are provided to ride on the cam surfaces 84. These may comprise rollers 87 each carried by a vertically extending shaft 88 having bearing rollers 89 to cooperate with a hollow boss 90 formed on the framework of the apparatus to maintain the shaft 88 in vertical position. As the floating member 83 rotates the rollers 87 ride upwardly against gravity or are allowed to descend on the sloping cam surfaces 84, these surfaces being preferably curved so that the steepness of the slope progressively increases, thus increasing the resistance to further rotation of the member 83. In order to regulate the resistance as desired I mount a removable weight 91 on the top of each shaft 88, these weights being preferably of such a mass as to permit the rollers 87 to ride about half way up the cam surfaces 84 when the consistency of the pulp in the penstock 45 is at the figure desired. By changing the weights 91, the apparatus can be readily adjusted to deliver stock of a different regulated consistency without interrupting the operation of the mechanism. If for example a run of thinner stock is desired, the weights 91 may be replaced by lighter weights so that the normal torque on the paddle shaft will be reduced and will be balanced by the decreased resistance of a more dilute stock. By making the weight-carrying shafts 88, the cam followers 87, and the rollers 89 of lightweight material, the apparatus may be made to operate with very dilute stock. The curve of the cam surfaces 84 may be any curve of increasing slope. I prefer, however, to adopt a parabolic curve, the tangent to which at its lower end is at an angle of 30° to the horizontal, while the tangent at its upper end is at an angle of 60° to the horizontal. When such a curve is employed the angle of rotation of the member 83 is directly proportional to the torque impressed on the paddle shaft 76. Since the angular position of the member 83 is thus a measure of the torque on the shaft 76 and hence of the consistency of the pulp stock, suitable scale markings (not shown) may be made directly on the member 83 to cooperate with a fixed index, or, as illustrated in Figure 9, scale markings may be inscribed on one or both of the vertical shafts 88.

It is desirable that the member 83 be permitted to adjust itself freely to the angular position corresponding to the torque on the shaft 76. In order to avoid as far as possible interference with such adjustment and at the same time to provide for positive, automatically regulated actuation of the valve 49, I may provide mechanism such as is illustrated in Figures 5 to 12. Briefly this mechanism comprises a ratchet wheel 92 which is held against axial movement and is in threaded engagement with a threaded portion 93 of the controller rod 73, the latter being held against rotation as by a suitable arm 94 having a yoke 95 slidably fitted on a fixed shaft 96 as shown in Figure 4. Rotation of the ratchet wheel 92 thus results in the reciprocation of the rod 73 and hence of the valve stem 67. In order to rotate the ratchet wheel 92 in the desired direction to open or close the valve 49 I may provide a pair of pawls 97, 98 on opposite sides of the ratchet wheel 92, these pawls being adapted for selective engagement with the teeth of the ratchet wheel 92. In order to make the action of the ratchet mechanism more sensitive, I may employ a number of parallel ratchet wheels, four being shown in Figures 6 and 7, to be engaged by four pawls in each set 97, 98. The four ratchet wheels are relatively arranged so as to be successively spaced by the distance of a quarter tooth. In this way the minimum turn of the ratchet wheel for one reciprocation of the pawls is equivalent to a quarter tooth instead of a full tooth, as would be the case if a single ratchet wheel and pair of pawls were employed. The pawls of each set may be mounted on a suitable pawl carrier consisting of a block 99 from which there extends downwardly a shaft 100 adapted to slide in an elongated bearing 101 by which the motion of the pawl carrier is maintained in a vertical direction. A feeler rod 102 also extends downwardly from each block 99 so that its lower end 103 engages with a serrated cam surface formed on the upper edge of the floating member 83. This portion of the member 83, as illustrated in Figure 9, comprises a high level 105 connected by descending serrated cam surfaces 104 to low levels 106. The lower ends 103 of the feeler rods 102 are adapted to engage some point of the cam surface 104 or the adjacent high or low levels 105, 106, thus limiting the extent of downward reciprocating stroke of the pawls 97, 98. If, as shown in Figure 9, the angular position of the member 83 is such that both feeler points 103 engage the high level 105 of the floating member, the pawls 97, 98 in such case do not descend sufficiently to engage any of the teeth of the ratchet wheels 92, so that there is no resulting motion of the control rod 73 on the valve stem 67.

In order to provide for the regular reciprocation of the pawls 97, 98, a suitable bunter 107 may be mounted for vertical reciprocation in suitable bearings 108, 109. This bunter as shown in Figure 9 is provided with a pair of laterally extending arms 110 which are adapted to engage the lower ends of the shaft 100 and to push the carriers 99 with the pawls 97, 98 upwardly. As the bunter 107 descends, the pawl carriers with their pawls are allowed to descend by gravity until stopped by the engagement of the respective feeler ends 103 with the cam surface of the member 83. As shown on the drawings, the portions of the cam surfaces on the member 83 which are engaged by the feelers 103 are notched, so that when the feelers engage the member 83, they lock it against rotation. This steadies the action of the delicately balanced detecting mechanism which is directly responsive to the consistency of the pulp stock, this mechanism consisting of the cam member 83, the paddle, and the mechanism connecting this member with the paddle. On the other hand, the operating mechanism for adjusting the water valve is heavy and rugged. Whenever the rugged valve-operating mechanism is mechanically connected to the delicate detecting mechanism by engagement of the feelers 103 with the cam member 83, the delicate mechanism is locked by the feelers so that there is no reactionary effect on the delicate mechanism to disturb its operation. When the heavy valve-actuating mechanism is in operative motion, it is entirely separated from the delicate mechanism, the latter then being free to seek a new position of balance if the consistency of the stock is changing. Thus the valve adjusting efforts of the heavy mechanism have no tendency to modify or disturb the consistency-responsive action of the delicate detecting mechanism. The bunter may be driven by any suitable means such as a rock arm 111 which may be mounted on a suitable rock shaft 112. This shaft may be suitably rocked as by a short arm 113 having a bearing 114 on the end thereof fitted in a recess in an eccentric strap 115 reciprocated by an eccentric 116 as shown in Figure 5. The eccentric 116 is preferably keyed to the hub of the gear wheel 78 so as to rotate therewith. As the gear wheel 78 is constantly driven during the operation of the mechanism, the bunter 107 will be constantly reciprocated.

Figure 9 shows the position of the parts when the pulp coming through the penstock is of the consistency for which the mechanism is adjusted. If the pulp becomes thicker or thinner, the torque on the paddle shaft 76 will change and will result in a change of angular position of the floating member 83, this member being sensitive to such changes at it is allowed to turn freely during the periods when each feeler point 103 is lifted clear of its upper surface. When the member 83 is turned through an arc depending on the extent of change of consistency of the pulp, it may assume a position relative to the feeler points 103 such as is illustrated in Figure 12. In such case the feeler point 103 connected with the pawl 97 engages on the surface 105 as the bunter descends whereas the feeler point 103 associated with the pawl 98 descends further and engages a point on the serrated sloping surface 104 which permits the pawl 98 to engage the ratchet wheel 92.

Figure 8:
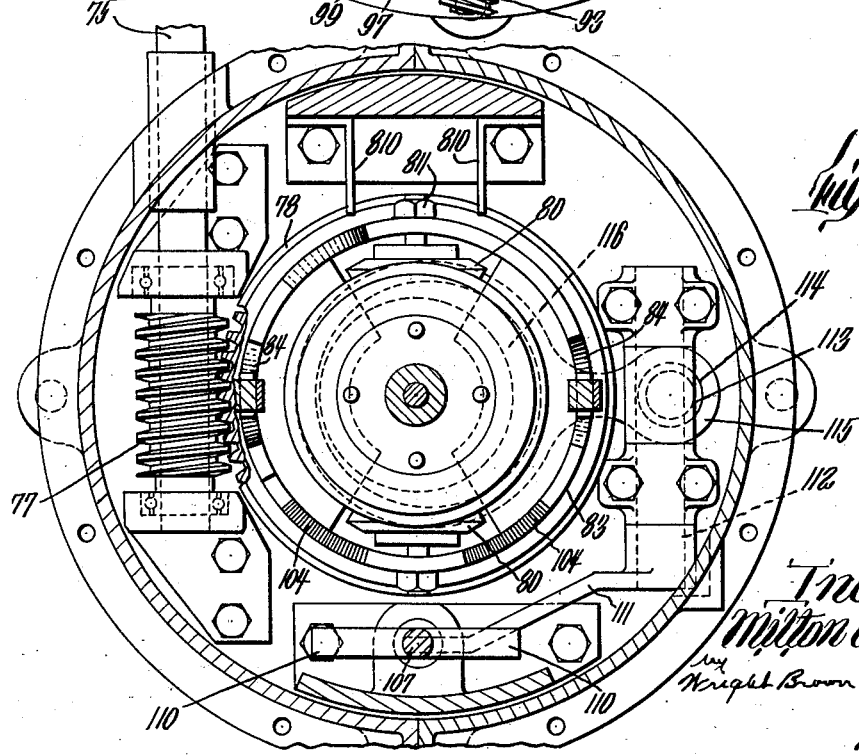
Figure 8 is a section on the line 8—8 of Figures 4, 6 and 9.

As shown, the first step or tooth of the cam surface 104 drops down a considerable distance. As a result of this construction, the pawls 97, 98 are held well above the ratchet wheel when the feeler points 103 engage the high surface 105, and there is no danger of accidental catching of both pawls simultaneously on the wheel. When either feeler point 103 reaches its end of the high surface 105, the next step lowers it sufficiently to enable the corresponding pawl to engage the ratchet wheel. In order to insure positive engagement of the pawls with the ratchet teeth, each pawl may be provided with a light leaf spring 117 which presses against the side wall of the frame as shown in Figure 12 and resiliently presses the pawl 98 against the wheel. It is obvious that the further the member 83 turns in response to a change in the consistency of the pulp, the lower down the slope 104 will be the point of contact of the feeler 103 and the greater will be the angle of turn of the ratchet wheel 92 when the pawl carrier with its pawl 98 is pushed upwardly by the positive action of the bunter 107. Thus the rate of opening and closing of the valve 49 varies with the degree of difference of the pulp consistency from normal so that "hunting" of the apparatus is thereby minimized and violent fluctuations of the consistency of the pulp delivered are avoided. Stops are preferably provided to limit the angle through which the member 83 may turn. These may be as shown in Figures 6 and 8, a pair of fingers 810 being mounted on a convenient portion of the frame to extend into the path of a nut 811 or other projection on the member 83.

Figure 7:
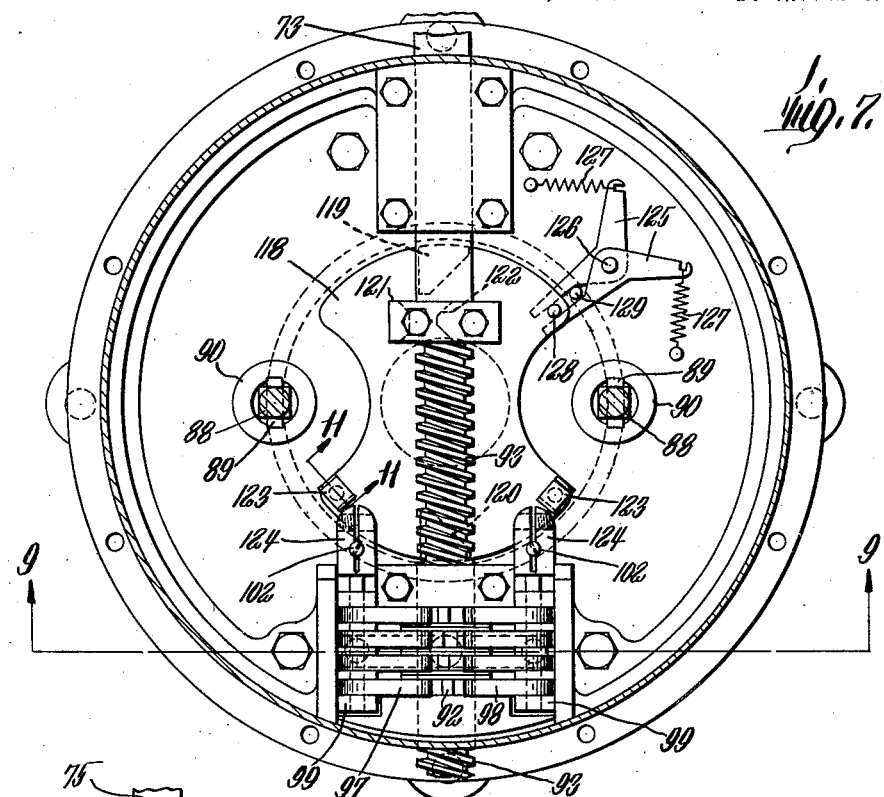
Figure 7 is a section on the line 7—7 of Figures 4, 6 and 9.

In Figures 6 and 7 means are illustrated for preventing excessive reciprocation of the control rod 73 in either direction which might be caused by abnormal conditions such as the failure or sticking of some parts of the apparatus and which might also result in injury to the apparatus. To this end a suitable plate 118 may be rotatably mounted beneath the rod 73. Cam blocks 119, 120 may be secured on the upper surface of the plate 118. At suitable points on the rod 73, as shown in Figure 7, I mount a clamp 121 having a cam portion 122 adapted to engage a face of the cam block 119 or 120 when the rod 73 is moved to one end or the other of its travel. As shown in Figure 7 if the rod 73 reaches either end of its travel, engagement with the blocks 119 or 120 will result in a turning of the plate 118 through a small angle. The plate 118 also carries thereon a pair of stop fingers 123. These fingers are located in close proximity to suitable extensions 124 of the pawl carriers 99. Rotation of the plate 118 through a slight angle in either direction will result in the movement of one of the stop fingers 123 beneath its adjacent extension 124. This results in the corresponding pawl carrier being held out of operation, the parts being so arranged that when either one of the pawl carriers operates so as to push the control rod 73 to its corresponding limiting position, the movement of the plate 118 will be such as to throw the active pawl out of operation. This, however, leaves the opposite pawl free to operate as soon as pulp conditions change in such a way as to allow the opposite pawl to become operative. Operation of this pawl will result in the removal of the cam 122 from the block 119 or 120 permitting the plate 118 to resume its normal position as shown in Figure 7.

In order to provide means for moving the plate 118 back to its normal position a pair of levers 125 may be mounted on a fulcrum pin 126, one arm of each lever being held by suitable springs 127, the other arms being arranged to engage opposite sides of a fixed pin 128 projecting from the surface of the plate 118. A second pin 129, fixed to the framework of the apparatus, limits the motion of each of the arms in one direction. Movement of the plate 118 will thus be against the tension resistance of one or the other of the springs 127 which will act to restore the plate 118 to its normal position when the cam 122 is removed from the block 119 or 120. In order to avoid jamming of the stop finger 123 against the side of the extension 124, which might occur if the plate 118 were turned when the pawl carriage was in its lowered position, the stop finger 123 may be constructed as shown in Figure 11, this construction consisting of a fixed standard 130 and a movable piece 131 resiliently held against the standard 130 as by a leaf spring 132 secured to the standard 130 as by a clamp nut 133. The stop finger is preferably so mounted that the projecting portion 134 of the movable member 131 is directed toward the projection 124 of the pawl carriage, so that if the stop finger is moved against the extension 124 the member 130 yields resiliently until the pawl carriage is raised, whereupon the spring 132 snaps the member 131 under the extension 124, whereupon the carriage in descending is caught on the top surface of the stop finger.

The apparatus hereinbefore described is purely mechanical. Figure 21 illustrates a modified form of apparatus operated in the same way but partly by electrical means. As shown a paddle 51 is rotated in the upper end of a vertical penstock 45 through which pulp stock flows upwardly and spills over the open upper edge into a box 46. The paddle 51 is driven at substantially constant speed, as by a motor 52 to which it is operatively connected by mechanism illustrated in Figure 22. The valve 49 for regulating the supply of diluting water may be of the same construction as that hereinbefore described in detail and may be operated by a reciprocating valve stem 67 which is also adjustably rotatable as by a suitable handle 69, to vary its capacity. Reciprocation of the valve stem 67 may be effected by a suitable gear wheel 135, the hub of which is screw threaded onto a control rod 136, the gear wheel 135 being held against axial motion and the rod 136 being held against rotation by any suitable means. The gear wheel 135 may be driven as by a worm 137 mounted on the shaft of an electric motor 138 which is of any suitable reversible type and is controlled by connections made automatically in the control apparatus generally indicated as 139. In order to prevent over-travel of the valve stem 67, I may mount thereon a pair of fingers 140, 141 which are arranged to engage switch arms 142, 143 respectively when the valve stem 67 reaches its limit of travel in either direction. This opens the active circuit of the motor 138, but permits the closing of the other circuit to operate the motor in its opposite direction.

As illustrated in Figure 22 the motor 52 may be connected by a suitable shaft 144 and worm 145 to a gear wheel 146. The gear wheel 146, as shown, is resiliently connected to the paddle shaft 76 through a suitable spring 147 which at one end is secured to a disk 148 adjustably fixed on the gear wheel 146, and at its other end to a disk 149 which, in turn, is keyed to the shaft 76. It is obvious that resistance to the turning of the shaft 76 will be resiliently opposed by the spring 147 and that the angular relation between the shaft and the gear wheel 146 will vary as the resistance of the paddle to rotation or the torque impressed on the shaft 76. The angular relation between the shaft 76 and the gear wheel 146 is the same as the angular relation between a disk 150 which is keyed to the shaft 76 and a cylindrical bushing 151 of insulating material which is fixed on the hub member of the gear wheel 146. Mounted in the surface of the bushing 151 are a pair of metal plates 152, 153, the flat shape of these plates being illustrated in Figure 27. These plates, as shown in Figure 22, are so fixed in the surface of the bushing 151 that their upper edges are horizontal, their lower edges curving from adjacent points upwardly in opposite directions. A pair of slip rings 154, 155 are mounted in the surface of the bushing 151 and are connected, respectively, to the plates 152 and 153, as by suitable wires 156, 157. Suitable brushes 158 connect the slip rings with wires 160 and 161 which lead to the motor 138. The third control wire 162 leading to the motor 138 is connected through a suitable brush 163 to a slip ring 164 mounted in the periphery of the disk 150 and suitably insulated therefrom. In order to connect the wire 162 with the wire 161 or 160 so as to operate the motor 138 in accordance with the angular relation between the gear wheel 146 and shaft 76, that is, the angular relation between the disk 150 and the bushing 151, I provide a vertically reciprocable conducting rod 165 which is electrically connected to the slip ring 164 as by a suitable brush 166 against which it bears and a connecting wire 167, as shown in Figure 24, these parts being suitably insulated from the disk 150. The rod 165 is likewise connected, as by a wire 168 at its lower end to a brush 169 which is carried thereby and reciprocable therewith. The block 169 is mounted in a block 170 of insulating material secured to the lower end of the rod 165 and is arranged to bear against the bushing 161 or the plates in the surface thereof. Thus it is evident that whenever the brush 169 is in contact with the plate 152 or 153, the wire 162 will then be connected, respectively, with the wire 160 or 161 so as to operate the motor 138 in one direction or the other. During the operation of the mechanism the shaft 76, the bushing 151, and the disk 150 are all rotated together, the disk 150 and the bushing 151, however, being subject to relative angular change in response to changes of consistency in the pulp stock. In order to reciprocate vertically the rod 165 and the brush 169 carried thereby, a cam follower 171 is mounted at the upper end of the rod 165 in such a way as to ride in a reversing traverse groove 172 formed in a fixed cylinder 173. As the cam follower 171 follows the groove 172 the brush 169 reciprocates vertically. By adjusting the tension on the spring 147, the relative angular position of the shaft 76 and the gear wheel 146 may be so regulated that when the pulp stock is of the desired consistency, the brush 169 will reciprocate on the bushing 151 between the short ends of the plates 152, 153 and will come in contact with neither of the plates. If, however, the angular relation between the shaft 76 and the gear wheel 146 changes in response to a change in the consistency of the pulp stock, the brush 169 will move angularly on the surface of the bushing 151 so that at the top of its vertical stroke it will come in contact with the narrow end of the plate 152 or 153 and will thus connect the wire 162 with the corresponding wire 160 or 161 for a brief interval. If the pulp stock varies by a considerable degree from its desired consistency, this will result in a larger angle of turn from the normal angular relation between the shaft 76 and the gear wheel 146, so that the vertical travel of the brush 169 will be over a greater height of the plate 152 or 153, with the result that a contact for operating the motor 138 will be established for a greater portion of the stroke of the brush 169 than when the pulp stock is only slightly varied from its desired consistency. Thus a great variation from proper consistency is quickly restored to normal by the more continuous action of the motor 138 in the proper direction.

Figure 29:
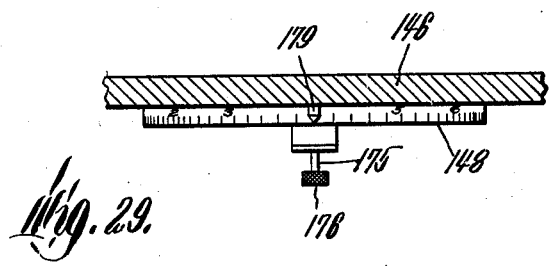
Figure 29 is an elevation of certain parts of the mechanism shown in Figure 22.

The device can be adjusted to regulate the water supply for any desired pulp consistency by adjustment of the spring 147. This may be readily effected by providing a circular series of holes 174 in the gear wheel 146 into any one of which a pin 175 may project. As shown in Figure 22 this pin is carried by the disk 148 and may be provided with a finger piece 176 and a spring 177, the latter normally pressing the end of the pin into a hole 174 and retaining it therein. In order to facilitate the manipulation of the pin 175 to adjust the disk 148, a portion 178 of the casing about the mechanism may be constructed for easy removal. As shown in Figure 29, the disk 148 may be calibrated with suitable scale divisions to cooperate with an index 179 fixed to the gear wheel 146, to indicate in any desired units the pulp stock consistency corresponding to each setting of the disk.

In order to avoid the possibility of the brush 169 contacting with both plates 152, 153 at once, the long ends of the plates must be sufficiently separated as well as the short ends. Means may be provided for preventing the brush 169 from moving between the long end edges of the plates 152, 153 when the shaft 76 is rotated to an angle approximating 180° with reference to the gear wheel 146. To this end the disk 149 may be provided with a radially extending finger 180. Fixed to the gear wheel 146 is a pin 181 extending downwardly and supporting a stop member 182 with a portion thereof in the path of the finger 180. The portion of the stop member 182 which lies in the path of the finger 180 is of sufficient width to prevent the turning of the shaft 76 relative to the gear wheel 146 to such an extent as to move the brush 169 beyond the long vertical edge of the plate 152 or 153.

A modified form of electrically actuated mechanism is illustrated in Figures 30 to 33. This embodiment of the invention may be used if desired solely for indicating the consistency of the pulp stock but I may also provide therewith automatic regulating means in addition. The paddle shaft 76 may be driven by a suitable motor connected to a shaft 183 on which is mounted a worm 184 meshing with a worm gear 185. The gear wheel 185 may be fixed directly on the paddle shaft 76. In such case the torque on the paddle shaft can be observed from the power consumption of the motor, provided the connecting parts are mounted so as to make their friction negligible. Mechanical means, as shown in Figure 31, may however be provided for indicating the torque on the shaft 76. Thus the gear wheel 185 may carry a pair of pinions 186 meshing with opposing bevel gears 187, 188. The gear 187 is keyed to the shaft 76, the gear 188 being a floating gear resiliently held against rotation as by a suitable spring 189. A short shaft 190 is keyed to the gear 188 and extends upwardly through the casing of the apparatus. Fixed to the upper projecting end thereof is a block 191 having a radial arm 192 extending therefrom, the outer end of the arm being preferably pointed as at 193 to cooperate with scale divisions inscribed on the upper face of the casing. As the shaft 76 is driven it is obvious that a change in the resistance to rotation will result in a corresponding angular movement of the gear 188 against the resilient opposition of the spring 189, this angular movement being indicated on the scale by the index 193. This type of apparatus is of particular value in cases where occasional manual adjustment of the water supply valve is sufficient to maintain the pulp stock at its desired consistency.

In order to provide for automatic regulation by this type of apparatus, I may mount a second arm 194 on the casing, this arm being adjustable with reference to the casing by a suitable pin 195 adapted to enter any one of a series of holes 196 formed in the upper surface of the casing. The pin 195 may be spring pressed into a hole 196 as by a suitable spring 197 and a suitable finger piece 198 may be provided to facilitate manipulation. On the arm 194 I mount a rotatable disk 199 having a pair of teeth on its periphery adapted to mesh with a suitable tooth 200 mounted on the under face of the arm 192. Extending laterally from the disk 199 are a pair of arms 201, 202. As shown in Figures 30 and 32 the arm 201 extends also radially inward and downward and is provided with a contact shoe 203 at its lower end. The arm 202 extends radially outward and downward and terminates in a contact shoe 204. The shoes 203, 204 are both connected through their respective arms to a wire 205. In the upper surface of the casing of the mechanism and insulated therefrom a pair of metal rings 206, 207 are provided. When the disk 199 is rotated through a small angle in one direction the shoe 204 descends to the position shown in dotted lines in Figure 32 so as to contact with the ring 207. Rotation of the disk 199 in the opposite direction results in contact of the shoe 203 with the ring 206. As shown in Figures 31 and 33 the rings 206, 207 respectively, are connected with suitable binding posts 208, 209 which, in turn, may be connected with relays 210, 211 operated selectively to close suitable circuits for driving the motor 138 so as to regulate the amount of opening of the water valve 49, as hereinbefore described. In order to ensure a good electrical contact between the shoes 203, 204 and their respective rings 206, 207, I may provide a spring 212 having one end secured to the arm 194 and the other end secured to a face of the disk 199 at a point above its axis of rotation. The spring 212 is tensioned so that when the disk 199 is turned off center in either direction the spring will continue its rotation until one or the other of the shoes comes in contact with its ring. Rotation of the disk 199 is caused by rotation of the shaft 100 from its normal position corresponding to the torque impressed on the shaft 76 to rotate the paddle in the pulp stock of normal consistency.

Any desired consistency may be adopted as normal and maintained by adjusting the position of the arm 194. The automatic operation of the mechanism will result in keeping the arm 192 directly over the arm 194. Any change in pulp consistency will result in rotation of the arm 192 and hence in the rotation of the disk 199 so as to bring one of the contact shoes in contact with its respective ring, thus closing a circuit, which results in the actuation of the motor 138 to alter the valve 49 and thus to restore the pulp to its normal condition, whereupon the arm 192 returns to its position over the arm 194 and lifts the contact shoe from contact with its ring. To prevent over travel of the arm 192 I may mount in the top of the casing a stop pin 213.

In case apparatus as described is used in mills such as sulphite pulp mills where there is liable to be present in the atmosphere small quantities of chlorine or other corrosive gases, I prefer to protect the delicate working parts of the apparatus by enclosing them in a casing such as shown in Figure 5 and supplying as by a pipe 214, a stream of pure air to the casing to sweep out the atmosphere of the casing continually and thus to prevent the entry of corrosive gases thereinto.

An embodiment of my invention having thus been described, it should be evident to those skilled in the art that many changes and modifications may be made therein without departing from its spirit or scope as defined by the appended claims.

I claim:

1. The method of regulating the viscosity of a moving stream of fluid which comprises constantly moving a body in said stream relatively to said fluid, and automatically altering the viscosity of the fluid at a point prior to its contact with the body in response to changes in the resistance of the body to such motion.

2. The method of delivering a stream of fluid of substantially uniform consistency which comprises constantly measuring the viscosity of the fluid in the stream at a given point, adding a diluent to the stream before it reaches said point, and automatically controlling the rate of addition of said diluent in accordance with said viscosity.

3. The method of regulating the consistency of a stream of pulp stock, which comprises rotating a portion of the stock at a given point in the stream, measuring the frictional resistance between said rotating portion and the non-rotating stock contiguous thereto, introducing a diluent into the stream before it reaches said point, and regulating the rate of addition of said diluent in accordance with said frictional resistance.

4. Apparatus of the class described, comprising means for rotating a portion of a stream of fluid at a given point, means for measuring the frictional resistance between the rotating fluid and the non-rotating fluid contiguous thereto, means for adding a diluent to the stream before it reaches said point, means for mixing said diluent into the stream before it reaches said point, and means responsive to changes in said frictional resistance for automatically controlling the rate of addition of said diluent to the stream.

5. Apparatus of the class described comprising means for rotating a portion of a stream of fluid at a given point, means for measuring the frictional resistance between the rotating fluid and the non-rotating fluid contiguous thereto, means for adding a diluent to said stream before it reaches said point, and means responsive to changes in said frictional resistance and having a rate of action varying with the magnitude of said changes in frictional resistance from normal.

6. Apparatus of the class described comprising means for maintaining a stream of pulp stock, a paddle rotatably supported in said stream, means for rotating said paddle at substantially constant speed, means for adding diluent to said stock before it reaches said paddle, and means controlled by the resistance of said paddle to rotation for regulating the rate of addition of said diluent.

7. Apparatus of the class described comprising means for maintaining a stream of pulp stock, a paddle rotatably supported in said stream, means for rotating said paddle at substantially constant speed, means for adding diluent to said stock before it reaches said paddle, and means controlled by the resistance of said paddle to rotation for regulating the rate of addition of said diluent, said regulating means having a variable rate of action depending on the difference between the normal and actual resistance of the paddle to rotation.

8. Apparatus of the class described, comprising means for maintaining a flow of pulp stock, a rotatable paddle mounted in said stock with its axis of rotation in line with the direction of flow thereof, means for rotating said paddle at substantially constant speed, means for adding a diluent to said pulp stock before it reaches said paddle, and means controlled by the resistance of said paddle to rotation for regulating the rate of addition of said diluent.

9. Apparatus of the class described, comprising a rotatable shaft, means for driving said shaft, an element movable in response to changes in the torque impressed on said shaft, a control member, mechanism controlled by said member, and means for actuating said control member in accordance with said torque-responsive element, said actuating means including a cam carried by said element, a ratchet wheel operatively associated with said control member, a pair of opposed pawls selectively engageable with said ratchet wheel, pawl carriers, feeler rods carried by said pawl carriers and arranged for intermittent contact with said cam, and means for reciprocating said carriers with their pawls and feeler rods, said cam being shaped to limit the travel of the reciprocating carriers and to permit selective engagement of said pawls with said ratchet wheel according to the position of said torque-responsive element.

10. Apparatus of the class described for automatically moving a rod in one direction or the other according to increases or decreases in the torque impressed on a shaft rotating at constant speed, said apparatus comprising power means for rotating said shaft, a gear train connecting said power means with said shaft, a rotatable floating member supporting one of the gears of said train, means for resiliently opposing rotation of said floating member whereby its angular position is determined by the torque impressed on said shaft, a ratchet-wheel screw-threaded on said rod, means for holding said rod against rotation, means for holding said ratchet-wheel against axial movement, a pair of pawls on opposite sides of said ratchet wheel and selectively engageable therewith, carriers for said pawls, means for reciprocating said carriers and pawls, and cam surfaces associated with said floating member and arranged to engage said pawl carriers to control the selective engagement of said pawls with said ratchet-wheel according to the angular position of said floating element.

11. Apparatus of the class described, comprising a shaft, means for rotating said shaft at substantially constant speed, a control element, and means for rotating said control element in one direction or the other according to changes in the torque impressed on said constantly rotating shaft, the last said means including a cylindrical member mounted to turn on its axis, said member being connected to said constantly rotating shaft to alter its angular position in response to changes in the torque impressed on said constantly rotating shaft, a pair of cam surfaces formed on an edge of said cylindrical member, each comprising a series of steps descending in opposite directions, a pair of feeler rods reciprocable to engage a respective series of a steps whereby their strokes are limited in one direction, ratchet teeth or said control element, pawls carried by said feeler rods on opposite sides of said element and adapted to engage the teeth thereof only when said cylindrical cam member is in angular position to permit one of their respective feeler rods to engage the lower steps of its respective cam surface, means for positively moving said feeler rods on their strokes away from said cam surfaces and for permitting return of said feeler rods to engage their respective cam surfaces, and mechanism regulated by rotation of said control element.

12. Apparatus of the class described, comprising a vertical penstock, means for propelling pulp stock upwardly through said penstock, a paddle supported in said penstock for rotation on a vertical axis, means for supplying water to said penstock below said paddle, means for rotating said paddle at substantially constant speed, a valve for regulating the supply of water to said penstock, and mechanism operatively connected to said paddle and responsive to changes in the torque impressed on the paddle for automatically controlling said water supply valve.

13. Apparatus of the class described, comprising a rotatable shaft, means for rotating said shaft at substantially constant speed, a valve, and means for automatically regulating said valve in accordance with the torque impressed on said shaft.

14. Apparatus of the class described comprising a rotatable shaft, means for rotating said shaft at substantially constant speed, a valve, and means for automatically regulating said valve in accordance with the torque impressed on said shaft, the rate of action of said regulating means varying with the difference between the normal and actual torque impressed on said shaft.

15. Apparatus of the class described, comprising a rotatable shaft, means for rotating said shaft at substantially constant speed, a valve, and means for regulating said valve in accordance with the torque impressed on said shaft, said regulating means including power means, means for selectively connecting said power means with said valve for effecting opening or closing motion thereof, a member responsive to changes in the torque impressed on said rotating shaft, and means carried by said torque-responsive member for controlling the action of said connecting means.

16. Apparatus of the class described comprising a rotatable shaft, means for rotating said shaft at substantially constant speed, a valve including a casing, a valve member fitted therein for two motions, axial and rotary, said casing and member having cooperating ports with areas of registration variable by either of said motions of said valve member, means for adjusting the capacity of said valve by one of said motions, and means responsive to changes of torque on said rotating shaft for impressing the other said motion on said valve member to open and close the valve.

17. Apparatus of the class described, comprising a rotatable shaft, means for rotating said shaft at substantially constant speed, a valve including a casing, a valve member reciprocable and rotatable therein and a valve stem secured to said valve member, said casing and member having cooperating ports with areas of registration variable by axial reciprocation and by rotation of said valve member, means for adjusting the angular position of said valve member, and means responsive to changes in the torque impressed on said rotating shaft for reciprocating said valve member to open and close the valve.

18. Apparatus of the class described comprising means for maintaining a stream of pulp stock, a paddle rotatably supported in said stream, means for rotating said valve at substantially constant speed, means including a valve for adding water to said stream before it reaches said paddle, and means responsive to variations in resistance of said paddle to rotation for opening and closing said valve to control the rate of addition of water to the stock, said valve actuating means including means for varying the rate of opening and closing said valve in accordance with the difference between the normal and actual resistance of said paddle to rotation.

19. In apparatus for determining the consistency of a fluid, means for entraining a ring of fluid and rotating said ring against the contiguous surrounding fluid, said means comprising a rotating body having a number of vanes projecting radially a distance from the surface of the body which is short compared with the diameter of the body.

20. In apparatus for determining the consistency of pulp stock, means for entraining a ring of stock and rotating said ring against the contiguous surrounding stock, said means comprising a conical rotatable member having radial vanes thereon extending from the surface thereof a distance which is short compared with the diameter of the member.

21. In apparatus for automatically regulating the consistency of a stream of pulp stock, a paddle rotatably supported in said stream, a valve for controlling the addition of water to said stream, electrically controlled reversible means for opening and closing said valve, means for rotating said paddle at substantially constant speed, and means responsive to variations of torque impressed on said paddle for selectively energizing said valve opening and closing means, said responsive means including means for varying the rate of opening and closing of said valve in accordance with the difference between the normal and actual torque impressed on said paddle.

22. In apparatus for automatically regulating the consistency of a stream of pulp stock, a paddle rotatably supported in said stream, a valve for controlling the addition of water to said stream, electrically controlled reversible means for opening and closing said valve, means for rotating said paddle at substantially constant speed, and means responsive to variations of the torque impressed on said paddle for selectively energizing said valve opening and closing means.

23. In apparatus having a rotatable shaft and means for rotating said shaft, mechanism for controlling the operation of a reversible electric motor in accordance with variations in the torque impressed on said rotating shaft from a predetermined normal value, said mechanism comprising a cylindrical member directly driven by said shaft-rotating means and resiliently connected to said shaft for rotation therewith whereby changes in the resistance of said shaft to rotation result in corresponding changes in the mutual angular relation between said shaft and said member, a pair of contact plates of tapering width carried on the surface of said member and connected electrically to said reversible motor, a contact element carried by said shaft and reciprocable on the surface of said member into and out of contact with one of said plates, said contact element being electrically connected to said reversible motor, and means for reciprocating said element during the rotation of said shaft and member, said plates being arranged on said member so as to present a width for contact with said element varying with the angular displacement of said member from normal position relative to said shaft.

24. An apparatus for maintaining the consistency of a liquid constant, comprising a member for immersion in the liquid, an electric motor for imparting movement to said member, means for admitting a diluent to said liquid, a reversible motor for actuating said diluent admitting means, and means including a switch responsive to the resistance offered by the liquid to the movement of said member for controlling the operation of the last named electric motor.

25. Apparatus of the class described comprising a rotatable shaft, means for rotating said shaft at substantially constant speed, a valve, and means for automatically regulating the rate of opening and closing of said valve in accordance with the torque impressed on the shaft.

26. Apparatus of the class described comprising a characteristic of a body of material substantially constant, comprising a detecting mechanism directly responsive to changes in said characteristic, means for treating said material to vary said characteristic, means movable to control said treating means, and means intermittently and operatively connecting said control means and said mechanism, said connecting means locking said mechanism against adjustive movement when connected to said control means.

27. Apparatus for maintaining a characteristic of a body of material substantially constant, comprising a detecting mechanism including a cam member adjustively movable in response to changes in said characteristic, means for treating said material to vary said characteristic, means movable to control said treating means, and means intermittently engaging said cam member to connect said control means to said detecting mechanism and to lock said cam member against movement when so connected.

28. Apparatus for maintaining the consistency of a stream of pulp stock substantially constant, comprising a detecting mechanism directly responsive to changes in the consistency of said stock, means for supplying diluting liquid to said stream at a point before it reaches said mechanism, means for controlling said supply means, and means for intermittently and operatively connecting said control means and said mechanism, said connecting means locking said mechanism against adjustive movement when connected to said control means.

29. Apparatus of the class described comprising a detecting mechanism including a cam member adjustively movable in response to changes in a characteristic of a body of material, means for treating said material to vary said characteristic, means for operating said treating means, and means for controlling said operating means, said controlling means including a reciprocable element movable in one direction to engage and lock said cam member against movement, and movable in the opposite direction to operate said treating means, the magnitude of said operating action being determined by the position of the cam member when engaged by said element.

30. Apparatus for maintaining the consistency of a stream of pulp substantially constant, comprising a detecting mechanism including a cam member movable in direct response to changes in said consistency, said cam member having a serrated cam surface, means including a valve for diluting said steam before it reaches said detecting mechanism, means for regulating said valve, said regulating means including a valve stem and a ratchet device for operating said stem, a pawl movable through a variable working stroke to actuate said ratchet device, said pawl having a feeler portion movable into contact with said serrated cam surface on the return stroke to variably limit the length of stroke of said pawl and to lock the cam member against movement while engaged by said feeler portion, and means for driving said pawl member through its working stroke.

31. Apparatus for maintaining a characteristic of a body of material substantially constant, comprising means for treating said material to vary said characteristic, automatic control means for said treating means directly responsive to variations in said characteristic, said control means having various rates of operation corresponding to different deviations of said characteristic from a predetermined standard.

32. Apparatus for maintaining the consistency of a stream of pulp stock substantially constant, comprising a detecting mechanism responsive to changes in consistency of the stock in said stream, means including a valve for diluting said stock at a point before it reaches said detecting mechanism, and means controlled by said detecting mechanism for opening and closing said valve to counteract changes in the consistency of said stock, the rate of action of said opening and closing means being controlled and always dependent on the deviation of said consistency from a predetermined standard.

33. Apparatus for maintaining the viscosity of a stream of liquid substantially constant, comprising a detecting mechanism directly responsive to changes in said viscosity, means for diluting the stream at a point before it reaches said detecting mechanism, and means controlled by said detecting mechanism for operating said diluting means, said detecting mechanism including a movable member movable to different positions corresponding to different values in the viscosity of the diluted liquid, said control member having a normal position corresponding to a predetermined viscosity and independent of changes in the viscosity of the supplied liquid.

In testimony whereof I have affixed my signature.

MILTON O. SCHUR.